United States Patent
Bilhe et al.

(10) Patent No.: US 10,214,040 B2
(45) Date of Patent: Feb. 26, 2019

(54) METHOD FOR MARKING THE SURFACE OF A MECHANICAL PART WITH A PREDEFINED GRAPHICAL REPRESENTATION HAVING A HOLOGRAPHIC EFFECT

(71) Applicant: SAFRAN AIRCRAFT ENGINES, Paris (FR)

(72) Inventors: Pascal Fabrice Bilhe, Moissy-Cramayel (FR); Geoffrey Begue-Duthu, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 226 days.

(21) Appl. No.: 15/301,191

(22) PCT Filed: Mar. 26, 2015

(86) PCT No.: PCT/FR2015/050774
§ 371 (c)(1),
(2) Date: Sep. 30, 2016

(87) PCT Pub. No.: WO2015/150668
PCT Pub. Date: Oct. 8, 2015

(65) Prior Publication Data
US 2017/0021654 A1     Jan. 26, 2017

(30) Foreign Application Priority Data
Apr. 1, 2014    (FR) ................................. 14 52850

(51) Int. Cl.
*B41M 5/24* (2006.01)
*B23K 26/0622* (2014.01)
(Continued)

(52) U.S. Cl.
CPC ............. *B41M 5/24* (2013.01); *B23K 26/066* (2015.10); *B23K 26/0622* (2015.10);
(Continued)

(58) Field of Classification Search
CPC ................ B23K 26/361; B23K 26/066; B23K 26/0622; B41M 5/24; B41M 5/26; B41M 5/267; B41M 5/262; G03H 1/04
(Continued)

(56) References Cited

U.S. PATENT DOCUMENTS 4,194,814 A * 3/1980 Fischer .................. B29C 59/16
                                                              347/258
4,508,749 A * 4/1985 Brannon ................. G03F 7/039
                                                              216/58

(Continued)

FOREIGN PATENT DOCUMENTS

WO    2006/129972 A1    12/2006
WO    2007/042429 A1    4/2007

OTHER PUBLICATIONS

International Search Report dated Mar. 2, 2016 in PCT/FR15/050774 Filed Mar. 26, 2015.

*Primary Examiner* — Eric Stapleton
(74) *Attorney, Agent, or Firm* — Oblon, McClelland, Maier & Neustadt, L.L.P.

(57) ABSTRACT

A method of marking the surface of a mechanical part with a predefined graphic having a holographic type effect, the method including using a laser source to apply a succession of laser pulses to the outside surface of a part for marking, with different masks being interposed between the laser source and the outside surface of the part, each mask having a particular pattern, each laser pulse having a power density of at least 20 MW/cm² and a duration that is less than or equal to 100 ns.

9 Claims, 1 Drawing Sheet

(51) Int. Cl.
  *G03H 1/04* (2006.01)
  *B41M 5/26* (2006.01)
  *B23K 26/066* (2014.01)
  *B23K 26/361* (2014.01)

(52) U.S. Cl.
  CPC ............. *B23K 26/361* (2015.10); *B41M 5/26* (2013.01); *G03H 1/04* (2013.01); *B41M 5/262* (2013.01); *B41M 5/267* (2013.01)

(58) Field of Classification Search
  USPC .......................................................... 219/68
  See application file for complete search history.

(56) References Cited

U.S. PATENT DOCUMENTS

| | | | | |
|---|---|---|---|---|
| 5,653,900 A * | 8/1997 | Clement | ............ | B23K 26/0838 219/121.68 |
| 6,395,151 B1 * | 5/2002 | Schramm | .............. | C23C 14/042 118/723 VE |
| 6,423,935 B1 * | 7/2002 | Hackel | ............... | B23K 26/0069 219/121.6 |
| RE43,487 E * | 6/2012 | O'Brien | ............... | B23K 26/032 219/121.62 |
| 2002/0192572 A1 * | 12/2002 | Lau | ........................... | G03F 1/50 430/5 |
| 2003/0153182 A1 * | 8/2003 | Yamazaki | .......... | B23K 26/0604 438/689 |
| 2003/0201258 A1 * | 10/2003 | De Steur | ................. | B23K 26/18 219/121.69 |
| 2006/0183309 A1 * | 8/2006 | Asscher | ................... | B41M 5/24 438/597 |
| 2007/0160928 A1 * | 7/2007 | Yamada | ................ | G03F 7/0752 430/270.1 |
| 2007/0184639 A1 * | 8/2007 | Tanaka | ................. | B23K 26/067 438/487 |
| 2009/0007933 A1 * | 1/2009 | Thomas | ............... | B08B 7/0042 134/1 |
| 2009/0146409 A1 * | 6/2009 | Lesur | ..................... | B41M 5/267 283/73 |
| 2011/0099809 A1 * | 5/2011 | Hovel | ...................... | B23P 6/005 29/888 |
| 2012/0183701 A1 * | 7/2012 | Pilz | ....................... | B22F 3/1055 427/504 |
| 2013/0270269 A1 * | 10/2013 | Lewis | ..................... | B41M 5/24 220/270 |

\* cited by examiner

METHOD FOR MARKING THE SURFACE OF A MECHANICAL PART WITH A PREDEFINED GRAPHICAL REPRESENTATION HAVING A HOLOGRAPHIC EFFECT

BACKGROUND OF THE INVENTION

The present invention relates to the field of marking gas turbine engine parts.

A field of application of the invention is that of marking aviation turbine engine parts with a predefined graphic having a holographic type effect, in particular to enable them to be identified and authenticated.

In the field of aviation, it is known to apply a serial number (e.g. in the form of a hexadecimal-based code or in the form of a Datamatrix code) to certain parts of an engine for the purpose of identifying such parts (where this is referred to as "marking"). Using such a number, it is possible to be certain about the authenticity of parts and about their origin.

Marking is particularly desired for turbine and compressor blades of an aviation turbine engine. Specifically, blades are critical spare parts for which it is important to be certain of their origin in order to take account of the influence of replacing such parts on the lifetime of the turbine or of the compressor in question.

Parts, and in particular turbine or compressor blades of an aviation turbine engine, may be marked in various ways. Thus, laser marking is known in which the laser performs a plurality of passes, thereby making an imprint in the part for marking by removing material. Mechanical marking is also known in which use is made of a hammer or a pneumatic piston that imparts successive impacts, thereby imprinting a serial number on the part for marking. Also known is marking performed by means of a manual or automatic milling machine.

Marking techniques that rely on the principle of removing material or of deforming the part for marking in order to put a desired graphic thereon present a manifest drawback concerning the health of the material of the part for marking. Particularly when a part is made out of a single-crystal metal alloy, deformation or removal of material can lead to localised recrystallisation or to an irreversible microstructure defect.

Furthermore, when a part is to be marked with a predefined graphic having a holographic type effect, known marking methods rely on adding material, e.g. by modifying a photosensitive film or by superposing images within a polymer.

However, such techniques of marking by adding material are complex and expensive to perform, in particular on a part that is made out of a single-crystal metal alloy.

OBJECT AND SUMMARY OF THE INVENTION

A main object of the present invention is to mitigate such drawbacks by proposing a method that makes it possible in simple and rapid manner to mark the surface of a mechanical part with a predefined graphic having a holographic type effect, while avoiding the above-mentioned drawbacks.

In accordance with the invention, this object is achieved by a method of marking the surface of a mechanical part with a predefined graphic having a holographic type effect, the method comprising using a laser source to apply a succession of laser pulses to the outside surface of a part for marking, with different masks being interposed between the laser source and the outside surface of the part, each mask having a particular pattern, each laser pulse having a power density of at least 20 megawatts per square centimeter ($MW/cm^2$) and a duration that is less than or equal to 100 nanoseconds (ns).

The term "graphic with a holographic type effect" is used herein to mean a graphic for which light reflection changes as a function of the angle at which said graphic is observed (the graphic may appear or disappear depending on its angle of inclination relative to the eye of the observer, thereby creating an illusion of depth or relief).

The Applicant has observed that applying a succession of laser pulses under the above conditions through different masks enables a predefined graphic with a holographic type effect to be marked on a gas turbine engine part, while ablating very little material, and presenting excellent ability to withstand oxidizing conditions and high temperatures.

In particular, it has been found that the imprint left by such laser pulses in the surface of the part for marking is very superficial in terms of depth (less than one micrometer). It has also been observed that the imprint made by such laser pulses is long-lasting, even when it is subjected to high temperature (about 1100° C.) in a strongly oxidizing environment.

As a result, for an application to marking turbine or compressor blades, the method of the invention may be applied to a portion of a blade that is exposed to gas (e.g. the airfoil), thereby avoiding all of the drawbacks associated with marking the blade in a zone that is hidden. In particular, it is possible to identify blades by means of their marking even when the blades are mounted in an engine.

Furthermore, it has been found that the method of the invention is just as effective (in terms of little ablation of material and long life) regardless of whether the part for marking is made of metal (in particular Ni, Al, Ti, Fe, etc.), of composite material (in particular made of carbon fibers and an epoxy matrix), or of ceramic (in particular of zirconia).

Finally, the visual results obtained by the method of the invention depend on the succession of the various laser pulses applied to the outside surface of the part. In particular, the power density and/or the diameter of the mask and/or the particular pattern of the mask may be different for each pulse applied to the outside surface of the part.

A focusing lens may be interposed between the laser source and the outside surface of the part in order to modify the size of the beam emitted by the laser source. The laser source may be an Nd-YAG laser. Furthermore, each laser pulse may have an impact diameter of at least 0.5 millimeters (mm), thereby making the resulting marking visible to the naked eye.

When the part for marking is made of metal, each laser pulse preferably has power density lying in the range 0.04 gigawatts per square centimeter ($GW/cm^2$) to 0.55 $GW/cm^2$.

When the part for marking is made of composite material comprising carbon fibers and an epoxy matrix, each laser pulse preferably has power density lying in the range 0.15 $GW/cm^2$ to 2 $GW/cm^2$.

When the part for marking is made of ceramic, each laser pulse preferably has power density lying in the range 0.10 $GW/cm^2$ to 0.34 $GW/cm^2$.

The invention also provides the use of the method as defined above for marking a blade of a fan, a turbine, or a compressor of an aviation turbine engine.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF THE INVENTION

The invention applies to marking the surface of any part of a gas turbine engine with a predefined graphic having a holographic type effect.

The term "predefined graphic" is used to mean any predetermined geometrical shape or design, such as for example a logo, a serial number, a Datamatrix code, etc.

The term "holographic type effect" is used to mean a graphic for which light reflection changes as a function of the angle at which said graphic is observed.

A nonlimiting application example of the invention is that of surface marking blades for a fan, a turbine, or a compressor in an aviation turbine engine.

The method of the invention comprises applying a succession of laser pulses to the outside surface of a part for marking, with various masks being interposed between the laser source and the outside surface of the part, each mask having a particular pattern such that when the patterns are added to one another they define the graphic that it is desired to mark on the part.

According to the invention, each laser pulse that is applied to the outside surface of the part possesses a power density of at least 20 MW/cm$^2$ and a duration that is less than or equal to 100 ns.

Figure 1:
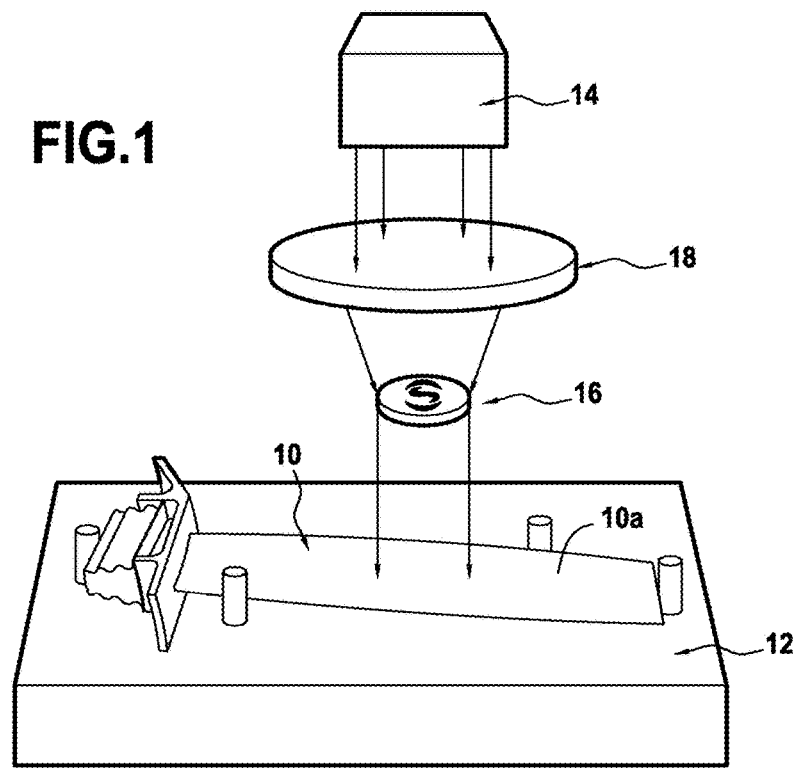
FIG. 1 is a diagrammatic view of an example setup for performing the method.

FIG. 1 shows diagrammatically an example of a setup that can be used for performing the marking method of the invention.

A part for marking 10 (e.g. a turbine blade) having an outside surface 10a on which the marking is to be performed is supported by a holder jig 12. The outside surface 10a of the part faces upwards.

A laser source 14, e.g. a laser of the frequency-doubled Nd-YAG type producing radiation at a wavelength of 1.064 micrometers (μm), is positioned above the holder jig 12 and is configured to deliver pulses having a power density of at least 20 MW/cm$^2$ and a duration that is less than or equal to 100 ns.

Furthermore, a mask 16 having a particular graphic pattern is interposed between the laser source and the outside surface 10a of the part 10 for marking. Likewise, a focusing lens 18 (which may be converging or diverging) is positioned between the laser 14 and the mask 16 in order to match the size of the laser beam emitted by the laser to the dimensions of the mask.

As a result, the laser 14 produces radiation that is focused by means of the focusing lens 18 into a beam that passes through the mask 16 prior to illuminating a selected zone of the outside surface of the part. The laser pulse produced by the laser 14 generates a plasma in this zone, with expansion of the plasma being accompanied by the release of a large amount of energy (thermomechanical and acoustic energy), leading to local modification at the surface of the part for marking. When the laser pulse produced by the laser has the above-specified settings (i.e. a power density of at least 20 MW/cm$^2$ and a duration that is less than or equal to 100 ns), this local modification at the surface of the part gives rise to an imprint left in the surface of the part.

By applying a succession of laser pulses under such conditions, while changing the mask and changing the power density of the pulse between each successive pulse, the marking obtained by the method of the invention consists in a superposition of different mask patterns forming a design with a holographic type effect.

The marking method of the invention may be applied to any type of material. In particular, it is well adapted to marking parts made of metal, of ceramic, or of composite material. The method also applies to any material for coating the surface of a part.

When the part for marking is made of metal, the laser pulse that is applied has a power density that preferably lies in the range 0.04 GW/cm$^2$ to 0.55 GW/cm$^2$ so as to obtain an imprint that is entirely intelligible.

More precisely, for a part made of nickel, the power density that is applied advantageously lies in the range 0.10 GW/cm$^2$ to 0.52 GW/cm$^2$. For a part made of aluminum, the applied power density lies in the range 0.20 GW/cm$^2$ to 0.55 GW/cm$^2$, and for a part made of steel, the applied power density preferably lies in the range 0.10 GW/cm$^2$ to 0.50 GW/cm$^2$.

Furthermore, when the part for marking is made of a composite material having carbon fibers and an epoxy matrix, each laser pulse preferably has a power density lying in the range 0.15 GW/cm$^2$ to 2 GW/cm$^2$ so as to obtain an imprint that is entirely intelligible.

Finally, when the part for marking is made of a ceramic, each laser pulse preferably has a power density lying in the range 0.10 GW/cm$^2$ to 0.34 GW/cm$^2$ so as to obtain an imprint that is entirely intelligible.

With reference to FIGS. 2 to 5, there follows a description of an implementation of the marking method of the invention.

In this example, the part for marking is made out of a nickel-based superalloy. The outside surface of the part is subjected to a succession of three laser pulses, with three different masks being interposed between the laser source and the outside surface of the part.

Figure 2:
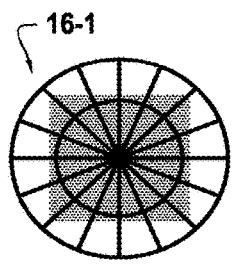
FIGS. 2 to 5 show an implementation of the method of the invention.

FIG. 2 shows a first mask 16-1 that is interposed between the laser source and the outside surface of the part for marking. This first mask presents a diameter of about 15 mm and a particular graphic pattern (circle split up by radii with the presence of a higher-contrast square in the center).

A first laser pulse with a power density P1 of 0.09 GW/cm$^2$ is applied to the outside surface of the part through the first mask 16-1.

Figure 3:
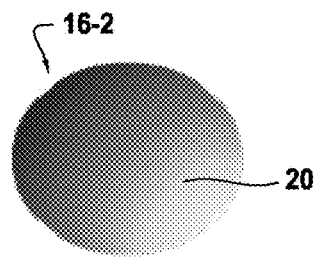

FIG. 3 shows a second mask 16-2 that is used during the second laser pulse that is applied to the outside surface of the part. This second mask 16-2 presents a diameter of about 10 mm and a particular graphic pattern (an opaque circle with lower opacity in a peripheral portion 20).

A second laser pulse with a power density P2 of 0.130 GW/cm$^2$ is applied to the outside surface of the part through the second mask 16-2.

Figure 4:

FIG. 4 shows a third mask 16-3 that is used during the third laser pulse that is applied to the outside surface of the part. This third mask 16-3 presents a diameter of about 6 mm and a particular graphic pattern (circle with an S-shaped pattern at the center).

A third laser pulse with a power density P3 of 0.300 GW/cm$^2$ is applied to the outside surface of the part through the third mask 16-3.

Figure 5:
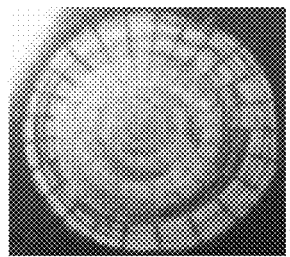
Figure 5:
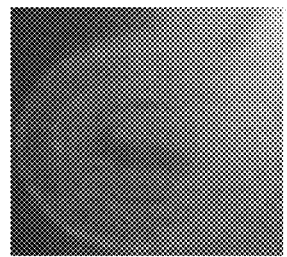
Figure 5:
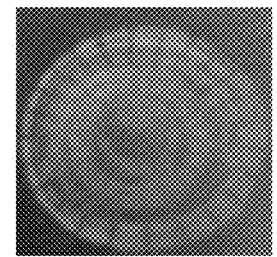

FIG. 5 shows the results obtained by applying these three laser pulses to the outside surface of the part. In this figure there can be seen an imprint formed on the outside surface of the part, this imprint having a graphic that is constituted by adding the graphic patterns of the three masks that were used.

Furthermore, the three images shown in this figure are views of the imprint seen looking along three different angles of observation. It can thus be seen that the graphic marked on the surface of the part can appear or disappear depending on its angle of inclination relative to the eye of the observer, thereby creating an illusion of depth or relief.

The invention claimed is:

1. A method of marking an outside surface of a mechanical part with a predefined graphic, the method comprising:
    using a laser source to apply a first laser pulse to the outside surface of the mechanical part with a first mask being interposed between the laser source and the outside surface of the mechanical part; and
    using the laser source to apply a second laser pulse to the outside surface of the mechanical part with a second mask being interposed between the laser source and the outside surface of the mechanical part,
    wherein each of the first and second masks has a particular pattern, and each laser pulse has a power density of at least 20 MW/cm$^2$ and a duration that is less than or equal to 100 ns,
    wherein the predefined graphic has a holographic type effect in which light reflection changes as a function of an angle at which the graphic is observed, and
    wherein the mechanical part is a blade of a turbine engine.

2. The method according to claim 1, wherein at least one of the power density of the first laser pulse and the second laser pulse, a diameter of the first mask and the second mask, or the particular pattern of the first mask and second mask are different from each other.

3. The method according to claim 1, wherein a focusing lens is interposed between the laser source and the outside surface of the mechanical part.

4. The method according to claim 1, wherein the laser source is an Nd-YAG laser.

5. The method according to claim 1, wherein the first laser pulse and the second laser pulse each has an impact diameter of at least 0.5 mm.

6. The method according to claim 1, wherein when the mechanical part is made of metal, each of the first laser pulse and the second laser pulse has power density lying in a range of 0.04 GW/cm$^2$ to 0.55 GW/cm$^2$.

7. The method according to claim 1, wherein when the mechanical part is made of composite material comprising carbon fibers and an epoxy matrix, each of the first laser pulse and the second laser pulse has a power density lying in a range of 0.15 GW/cm$^2$ to 2 GW/cm$^2$.

8. The method according to claim 1, wherein when the mechanical part is made of ceramic, each of the first laser pulse and the second laser pulse has a power density lying in a range of 0.10 GW/cm$^2$ to 0.34 GW/cm$^2$.

9. The method according to claim 1, wherein the blade is a blade of a fan, a blade of a turbine, or a blade of a compressor.

* * * * *